Patented Apr. 17, 1934

1,955,211

UNITED STATES PATENT OFFICE 1,955,211

METHOD OF PRODUCING COLLOIDAL SOLUTIONS OF INORGANIC SUBSTANCES IN POLYALCOHOLS, AND PRODUCTS OBTAINED THEREBY

Carl Hermann von Hoessle, Radebeul, Germany, assignor to Chemische Fabrik von Heyden, A. G., Radebeul, near Dresden, Germany, a corporation of Germany No Drawing. Application August 30, 1930, Serial No. 479,104. Renewed August 7, 1933. In Germany January 24, 1930

13 Claims. (Cl. 252—6)

In my co-pending application filed on August 12, 1930, under Serial No. 474,886, and being entitled "Process of making colloidal solutions of metals, metallic compounds and metalloids in polyalcohols and products obtained thereby", I have described a process by which colloidal solutions of metals, metallic oxides, metal salts, and metalloids may be produced in polyalcohols, such as glycol, glycerin etc. in the presence of suitable protective colloids.

In another co-pending application filed on the same day under Serial No. 479,103, and being entitled "Process for making colloidal solutions of metals, metallic compounds and metalloids in polyalcohols and products obtained thereby", I have described a process by which the same colloidal solutions of metals, metallic oxides, metal salts and metalloids may be produced by first preparing these aforesaid inorganic substances as sols first in a solvent, such as water, which is easily evaporated, and subsequently mixing such an aqueous colloidal solution with glycerin and then easily removing the solvent by evaporation.

In each of these two aforesaid senior cases various polyalcohols have been mentioned for instance such as glycol, glycerin etc., but glycerin has been cited in the examples as the preferable solvent because it is readily available.

Inasmuch as I have found that such colloidal solutions in glycol have also considerable merits and as in the claims of aforesaid senior applications only solutions in glycerin are specifically claimed, I am going to describe below by various examples how I proceed in applying glycol for the purposes of my invention. The colloidal substances may be generated first in glycol in the presence of suitable protective colloids, or, if preferred, one produces first the hydrosols of these substances mixes then the hydrosols with glycol and removes finally the water by evaporation.

Example 1

I dissolve 5 parts of silver nitrate in water and precipitate therefrom to silver oxide by adding sodium hydroxide. Then I dissolve 1-2 parts of sodium lignosulphonate in 100 parts of glycol. The silver oxide is suspended in the glycol solution, and while it is heated upon the water bath and well agitated, hydrogen gas is passed into the suspension.

I obtain a colloidal solution of silver in glycol, the solution displaying a light grey color. By treating this solution with a halogen, for instance iodine, I may obtain therefrom colloidal solutions of silver halides in glycol.

Example 2

4–5 parts of copper sulfate are transformed by sodium hydroxide into copper oxide, which is suspended in a solution of one part sodium lignosulphonate, or of similar protective colloids, in glycol; while this solution is heated hydrogen gas is passed into the same. I obtain a red brown, very stable copper monoxidesol.

Example 3

I dissolve 10 parts of colloidal silver (collargel) in 20 parts of water and add to this mixture 100 parts of glycol, whereupon the total mixture is heated upon the water bath and agitated until the water of the solution has evaporated.

Example 4

I mix 200 parts of a colloidal solution, containing approximately 1% iron hydroxide, with 20 parts glycol and the mixture is otherwise acted upon as described in Example 3.

Example 5

I mix 5 parts of colloidal copper sulfide with 20 parts of water and 40 parts of glycol; the total mixture is then well agitated and after the copper sulfide is entirely dissolved the water is evaporated.

Example 6

I mix 100 parts of glycol with 55 parts of an aqueous colloidal calomel solution, containing approximately 20% colloidal calomel, and heat the mixture upon the water bath until the water of the solution has evaporated.

What I claim is:

1. The method of making a colloidal solution of a metal in glycol, said method consisting in producing a solution of the colloidal form of the metal in an aqueous solvent, adding glycol to aforesaid colloidal solution, and evaporating the vehicle from the same.

2. The method of making a colloidal solution of a metal in glycol, said method consisting in producing the hydrosol of the metal, adding glycol to aforesaid colloidal solution, and evaporating the water from the same.

3. The method of making a colloidal solution of an inorganic element in glycol, said method consisting in suspending a metal oxide in a mixture of a protective colloid and glycol, and reducing the metal oxide to the metal by a gaseous reducing agent.

4. The method of making a colloidal solution of a metallic compound in glycol, said method consisting in producing a solution of the colloidal form of the metallic compound in an aqueous solvent, adding glycol to aforesaid solution, and evaporating the vehicle from the same.

5. The method of making a colloidal solution of a metallic compound in glycol, said method consisting in producing the hydrosol of the metallic compound, adding glycol to the aforesaid hydrosol, and evaporating the water from the same.

6. The method of making a colloidal solution of a metallic compound in glycol, said method consisting in producing the colloidal form of the metal compound in the presence of a protective colloid and glycol.

7. The method of making a colloidal metal halide in glycol, said method consisting in producing in the presence of a protective colloid and of glycol the colloidal form of the metal in solution, and adding a halogen to aforesaid colloidal solution of said metal.

8. The method of making a colloidal silver halide in glycol, said method consisting in producing in the presence of a protective colloid and of glycol the colloidal form of the metal in solution, and adding a halide to aforesaid colloidal silver solution.

9. As a new article of manufacture, colloidal solutions of metal in glycol.

10. As a new article of manufacture, colloidal solutions of metal oxides in glycol.

11. As a new article of manufacture, colloidal solutions of metal sulfides in glycol.

12. As a new article of manufacture, a colloidal solution of silver in glycol.

13. As a new article of manufacture, a colloidal solution of silver halide in glycol.

CARL HERMANN von HOESSLE.